(12) United States Patent
Schmidt et al.

(10) Patent No.: US 11,237,804 B2
(45) Date of Patent: Feb. 1, 2022

(54) SYSTEMS AND METHODS FOR APPLICATION RE-USE BY TYPE PATTERN MATCHING

(71) Applicant: ABB Schweiz AG, Baden (CH)

(72) Inventors: Benedikt Schmidt, Darmstadt (DE); Jeff Harding, Holly Springs, NC (US); Thomas Goldschmidt, Karlsdorf-Neuthard (DE)

(73) Assignee: ABB Schweiz AG, Baden (CH)

( * ) Notice: Subject to any disclaimer, the term of this patent is extended or adjusted under 35 U.S.C. 154(b) by 79 days.

(21) Appl. No.: 16/688,622

(22) Filed: Nov. 19, 2019

(65) Prior Publication Data
US 2020/0159732 A1    May 21, 2020

Related U.S. Application Data

(63) Continuation of application No. PCT/US2018/033682, filed on May 21, 2018.
(Continued)

(51) Int. Cl.
*G06F 16/21* (2019.01)
*G06F 16/23* (2019.01)
(Continued)

(52) U.S. Cl.
CPC .............. *G06F 8/36* (2013.01); *G06F 16/212* (2019.01); *G06F 16/2379* (2019.01);
(Continued)

(58) Field of Classification Search
CPC .... G06F 8/36; G06F 16/2379; G06F 16/2425; G06F 16/24552; G06F 16/212; G06F 16/2474; G06F 16/248; G06F 16/252; G06F 16/29; G06F 40/279; G06F 16/93; G06F 16/24578; G06N 20/00; G06N 20/10; G06N 5/04
See application file for complete search history.

(56) References Cited

U.S. PATENT DOCUMENTS 5,991,535 A    11/1999  Fowlow et al.
9,223,546 B1   12/2015  Chaffin
(Continued)

OTHER PUBLICATIONS

International Searching Authority—U.S., International Search Report & Written Opinion issued in corresponding Application No. PCT/US2018/033682, dated Sep. 2018, 13 pp.

*Primary Examiner* — Jorge A Casanova
(74) *Attorney, Agent, or Firm* — Leydig, Voit & Mayer, Ltd.

(57) ABSTRACT

A system for reusing program code from a first completed application in a second under-development application based on identified patterns matching between the types of data accessed by the first and second applications. The system has an information model database, a pattern database, an API and applications which query the information model through the API, resulting in stored raw access data. The raw access data is extracted and patterns are generated based on similarity of the abstracted patterns as between the first and second applications. Application programmers access the pattern database to create new programs and implement prior computer code in the new program based on a pattern match on data accessed by a prior-developed application.

11 Claims, 5 Drawing Sheets

Related U.S. Application Data

(60) Provisional application No. 62/508,499, filed on May 19, 2017.

(51) Int. Cl.

| | | |
|---|---|---|
| *G06F 16/242* | (2019.01) | |
| *G06F 16/2455* | (2019.01) | |
| *G06F 16/2457* | (2019.01) | |
| *G06F 16/2458* | (2019.01) | |
| *G06F 16/248* | (2019.01) | |
| *G06F 16/25* | (2019.01) | |
| *G06F 16/29* | (2019.01) | |
| *G06F 16/93* | (2019.01) | |
| *G06F 40/279* | (2020.01) | |
| *G06F 8/36* | (2018.01) | |
| *G06N 20/00* | (2019.01) | |
| *G06N 5/04* | (2006.01) | |

(52) U.S. Cl.
CPC ........ *G06F 16/248* (2019.01); *G06F 16/2425* (2019.01); *G06F 16/2474* (2019.01); *G06F 16/24552* (2019.01); *G06F 16/24578* (2019.01); *G06F 16/252* (2019.01); *G06F 16/29* (2019.01); *G06F 16/93* (2019.01); *G06F 40/279* (2020.01); *G06N 5/04* (2013.01); *G06N 20/00* (2019.01)

(56) References Cited

U.S. PATENT DOCUMENTS

| | | | |
|---|---|---|---|
| 9,311,062 B2 | 4/2016 | Braun et al. | |
| 2005/0262522 A1 | 11/2005 | Gassoway | |
| 2012/0296974 A1 | 11/2012 | Tabe | |
| 2013/0086556 A1 | 4/2013 | Grechanik | |
| 2013/0096899 A1* | 4/2013 | Usadi | E21B 43/00 703/10 |
| 2013/0103682 A1* | 4/2013 | Ghosh | G06F 16/3349 707/731 |
| 2014/0108418 A1* | 4/2014 | Elbaum | G06F 16/93 707/741 |
| 2014/0358601 A1 | 12/2014 | Smiley et al. | |
| 2015/0121335 A1 | 4/2015 | Braun et al. | |
| 2015/0293512 A1* | 10/2015 | Egge | G06F 30/367 703/2 |
| 2016/0066137 A1 | 3/2016 | Kulkarni et al. | |
| 2016/0364212 A1 | 12/2016 | Mohaban et al. | |

* cited by examiner

SYSTEMS AND METHODS FOR APPLICATION RE-USE BY TYPE PATTERN MATCHING

BACKGROUND

Cloud applications and analytics for assets are developed in various sub-domains for activities such as monitoring, device management or predictive maintenance. However, as the development of these applications is done by geographically and functionally dispersed teams, the application code developed among the different applications teams often creates a heterogeneous landscape of solutions. Maintenance of the applications is performed on a case by case basis despite the fact that a variety of functionalities across the applications is similar.

SUMMARY

Exemplary embodiments for adapting program code for use in new applications for managing asset data are provided. In one form of the present application there is contemplated, a method for reuse of computer code in a new application with the following acts:

querying, by a first application via the processor, on data in an information model database;

storing, by the processor, the query of a first application on the information model database as raw access data;

extracting, by the processor, a pattern from the raw access data describing a set of assets accessed by the first application;

storing, by the processor, the pattern in a pattern database;

querying, by the processor, on the pattern database for a pattern accessed by the first application for use in a second application;

determining, by the processor, a pattern match between the asset pattern data accessed by the first and second applications; and presenting to a user, the first application as an option for use in the second in-development application;

implementing code from the first application in the in-development application; and using the first application to monitor the operation of an asset described by the pattern data.

Another form of the present application contemplates a system for reusing computer code from at least one existing application in a new application, has: a cloud gateway for receiving data from a plurality of assets; a time event processor for handling time series data of the assets; a time series data storage for storing time series data handed by the time event processor; an information model database for storing metadata describing a plurality of assets; a plurality of applications for querying the information model database for metadata describing at least one asset resulting in raw access data; an extractor for extracting patterns from the raw access data to generate patterns therefrom; a pattern database for storing the patterns of access generated by the plurality of applications accessing the information model database metadata; and an analysis engine for ranking patterns based on overlap of the applications accessing the same patterns as the new application.

BRIEF DESCRIPTION OF THE DRAWINGS

In the accompanying drawings, structural embodiments are illustrated that, together with the description provided below, describe exemplary embodiments of re-purposing computer application code for managing asset data. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration, unless provided to the contrary.

DETAILED DESCRIPTION

Commercial and industrial processes utilize assets including but not limited to robots, drives, motors, pumps, valves, transformers and other equipment assets. Examples of other assets used in the contemplated processes and systems include but are not limited mobile devices, servers, and gateways. Application programmers create computer code for a plurality of applications 40 including but not limited to applications 40 that track the assets to prevent failure and determine the remaining useful life of the assets in an enterprise. The plurality of applications 40 are executable on an operating system or consumed as a service such as a cloud application accessed through the internet. The plurality of applications 40 access data that describes the assets that are part of the industrial process or system being monitored. An application programmer has access to semantic data in an information model 20 describing the assets and prior use cases involving the asset data.

Figure 1:
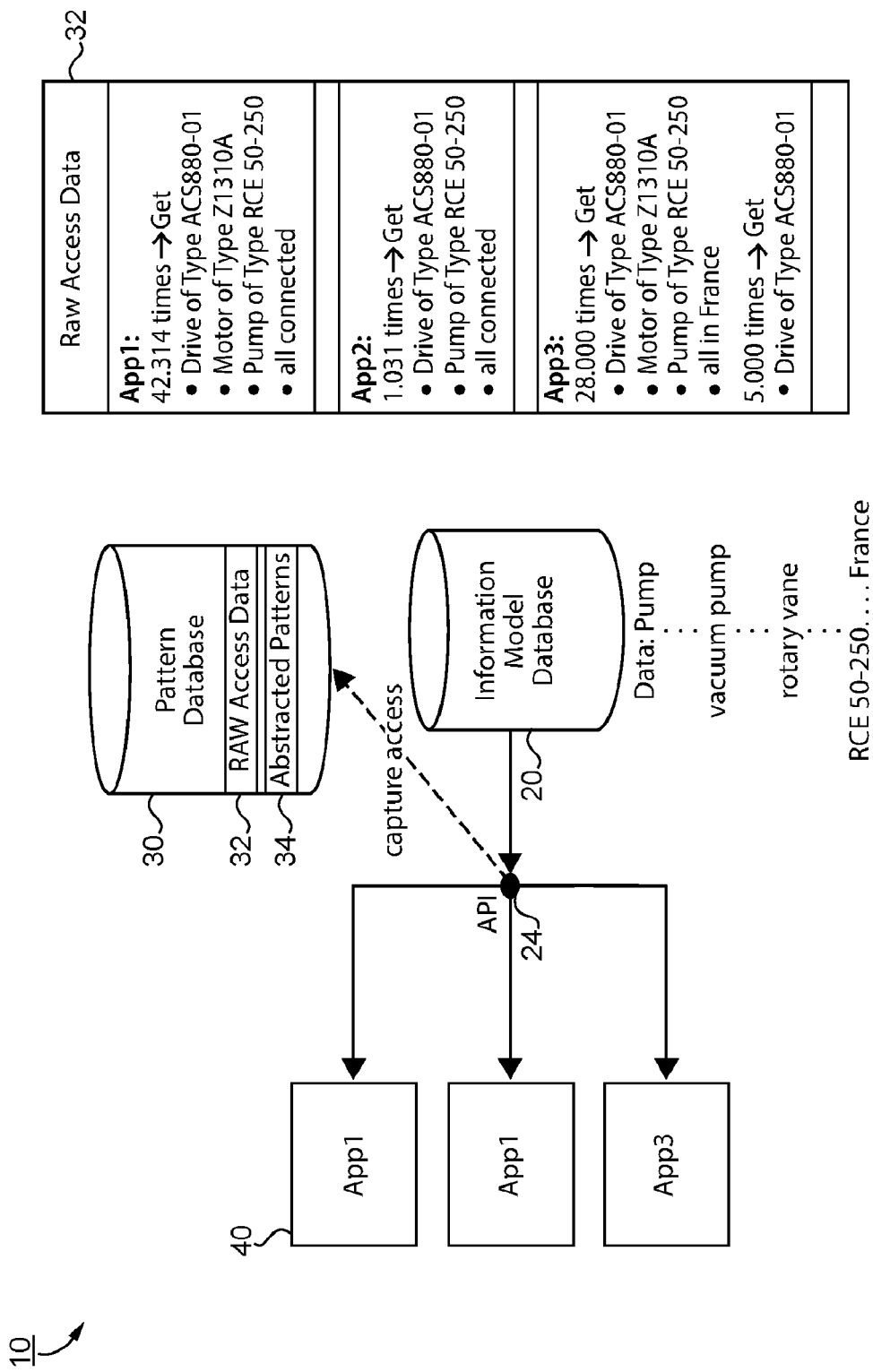
FIG. 1 is a schematic of a system for reuse of computer code in new applications and a plurality of applications performing queries on the information model database resulting in raw access data.

With reference to FIG. 1, a schematic of a system that allows a programmer to utilize pre-existing code from an application or plurality of applications and implement the code in a new, in-development application is shown. The system 10 has an information model database 20, a plurality of applications 40 that access the information model database 20, an application programming interface (API) 24, a pattern database 30 and an extractor 36.

The data in the information model database 20 is metadata that describes or represents other data in an enterprise. The metadata describes the assets in a system in a manner including but not limited to the general type of asset, specific type of asset, model, serial number, location of asset and the frequency with which the data arrives and is accessed by the applications 40. In one embodiment, the information model database 20 stores data that describes an installed base of assets, such as those assets managed by a process control system or an asset management system for monitoring, device management, and predictive maintenance in the form of structures, objects, and properties. The information model database 20 is accessed by queries from the plurality of applications 40 through the API 24.

The pattern database 30 stores the raw access data 32 generated by the queries of the plurality of applications 40 on the information model database 20 data. The raw access data 32 includes but is not limited to metadata described above but also the exact metadata and the frequency with which the applications 40 access the information model database 20 metadata. The raw access data 32 is abstracted by the extractor 36 expressing the data in terms corresponding to the domain of the plurality of applications 40 querying the information model. The patterns expressed in the extracted data are stored in the pattern database 30 as abstracted patterns 34. In one embodiment, the data access patterns by the plurality applications 40 overlap and only the common data accessed by the plurality of the applications 40 is represented in the abstracted pattern.

It should be understood that the raw data, queries thereon, identified patterns and associated databases can be implemented on a cloud-based platform. An application may execute as a service on the cloud platform, enabling the discovery of asset data from a single facility or a plurality of industrial facilities that are geographically dispersed. Access to the asset data is available to users regardless of their location through the cloud delivery method and cloud computing security.

Figure 5:
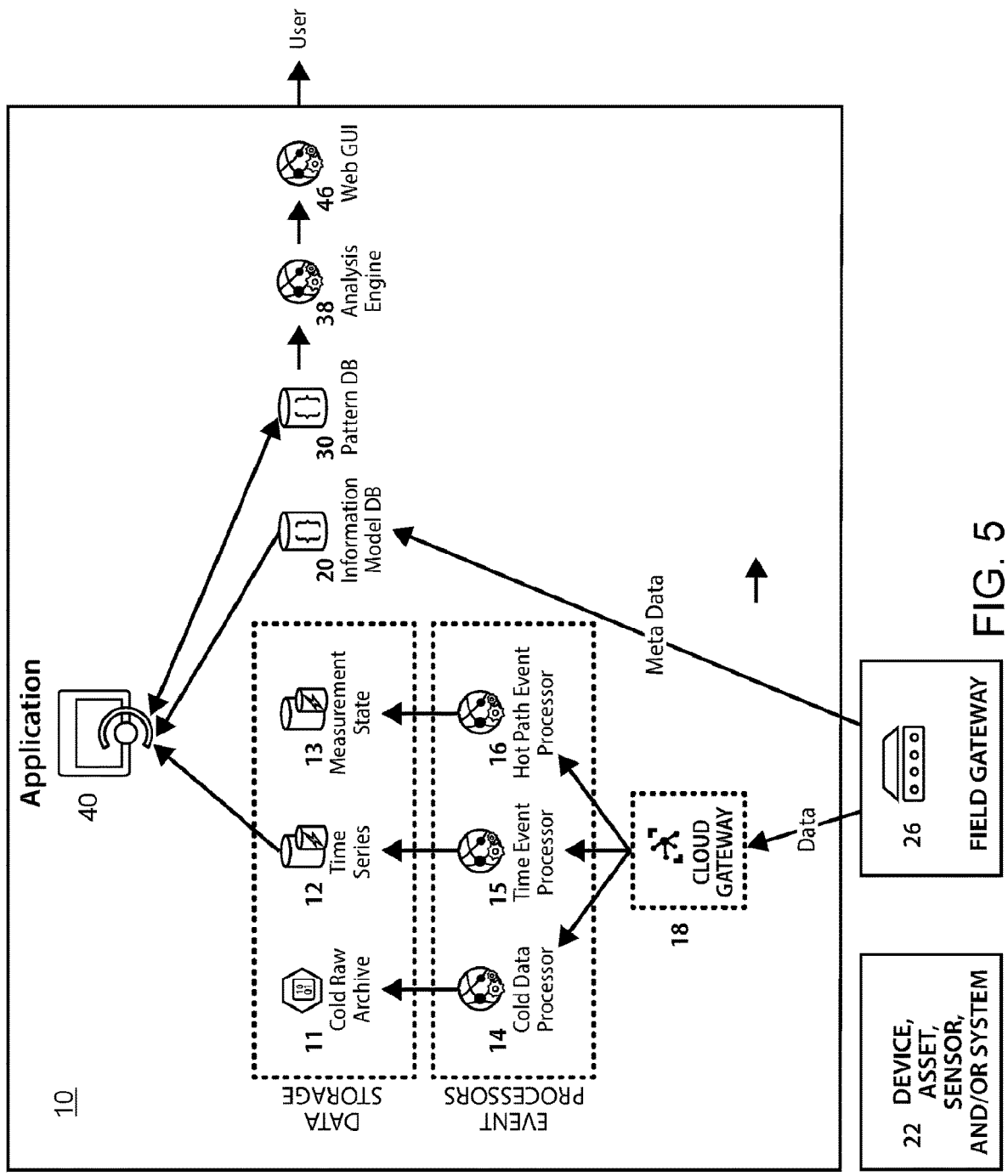
FIG. 5 shows one form of system architecture for reusing application code based on discovered patterns in the access data of computer applications to the asset metadata.

The system, whether implemented on a cloud platform, a networked computer system, or an embedded computer system, has a server, the information model and pattern databases 20, 30, a processor, an internal memory, an extractor component, event processors and a communication module for communicating with assets in the installed base as well as mobile devices for monitoring the assets and data storage 11, 12, 13 as depicted in FIG. 5.

The event processors 14, 15, 16, data storage 11, 12, 13, cloud gateway 18, information model database 20, pattern database 30, an analysis engine 38, graphical user interface 46 and applications 40 form the system 10 which in one embodiment is implemented as a cloud computing system. The devices, sensors and/or assets 22 that are independent or connected together in a system such as a process control system generate, transmit and/or broadcast data that is received by a field gateway 26. The asset 22 data is either raw data or metadata, the raw data being transmitted to the cloud gateway and the metadata being transmitted to the information model database 20. The field gateway 26 is resident in the cloud computing architecture of the system 10 or is alternatively an edge device that is located in proximity of the data source for analytics purposes.

The raw data is time series data from signals or measurements of sensors/devices/assets 22 and is routed to an event processor depending on type. Data of types that are accessed with less frequency are routed through the cold data processor 14 to the cold data storage 11 which represents slower storage capabilities. Data of types that are accessed with greater frequency are routed through the hot path even processor 16 to the measurement state database 13. Time series data, including but not limited to sensor measurements of pressure, temperature, vibration and other real-time values over a period of time are processed by the time event processor 15 for storage in a time series database 12. The applications 40 have access to time series database 12 data on the cloud computing system.

Cold data storage 11 is the product of the accessing of asset data 22 on demand. By way of non-limiting example, batch uploads of the asset data 22 can be processed from the device, sensors, or assets through the cold data processor 14 to the cold data storage 11. On the other hand, data flow is continuous from devices 22 to field gateway 26 to cloud gateway 18 to time event and hot path event processors 15, 16 to the respective time series and measurement state data storages 12, 13. In one form the cold data storage 11 includes time series data but not metadata which can also be stored in the information database 20.

The asset information may be stored in a hierarchy or structure in the information model database 20 and utilize classifications and product descriptions. One example of such asset information is metadata associated with the equipment assets. The hierarchy for asset data in the information model database is, by way of non-limiting example, an asset such as a pump at the highest level, a type of pump such as a vacuum pump at a second level, a specific type of pump such as a rotary vane, diaphragm, or scroll pump at a third level, a model of pump within the class of vacuum pumps at a fourth level and the location of the pump in a country, region, or plant as yet another level in the hierarchy. The frequency with which each application in a domain accesses the information model 20 is tracked as a property within the raw access data 32 along with the asset types, models, and location of the assets. Although the objects, types and properties in the information model database 20 are hierarchically structured for storage in an object-oriented database as described above, the data may also be stored in a relational database, a business intelligence database or another type of information model database 20. In one embodiment, the plurality of applications 40 use classifications and product descriptions such as in the eCl@ss standard, which has the exemplary structural elements of class, property, value, unit, keyword, and synonym.

With reference to FIG. 1, a first application of the plurality of applications 40 queries the information model database 20 via an application programming interface (API) 24 which monitors access to the information model database and frequency of incoming operational data on each asset. In an alternative and/or additional form, information of the queries from the API 24 can be used to populate the pattern database 30 where such queries can be stored as raw access data 32. The results of the information model database 20 query by the first application 40 are stored as raw access data 32 in the pattern database 30. An example of the raw access data 32 stored in the pattern database 30 based on a query by a plurality of applications 40 is as follows. The information model 20 is queried by the first application of the plurality of applications 40 on at least one occasion to return programs that include the pattern of a drive of type ACS880-01, a motor of type Z1310A, and a pump of type RCE 50-250 that are interconnected in a process and/or capable of communicating to a process control system, asset management system, another type of application, mobile device, or gateway. It should be understood that the frequency of data access is measured and analyzed by orders of magnitude rather than any specific frequency examples provided herein and that the frequency of applications accessing the data is provided by way of non-limiting example. For example, information model 20 data that is accessed by applications on a basis of $10^4$ number of times is considered more relevant to a developer query than data that is accessed by applications on a basis of $10^3$ number of times. The present disclosure contemplates frequency of access from one access to $10^6$ number of times accessed.

The second application of the plurality of applications 40 accesses the drive of type ACS880-01 and the pump of type RCE 50-250 on at least one occasion and the drive and pump are connected. A third application of the plurality of applications 40, by way of non-limiting example, accesses a drive of type ACS880-01, motor of type Z1310A, and a pump of type RCE 50-250 that are physically located in France and have been accessed on at least one occasion. While the motor, pump, and drive are all located in France, there is no connection between the assets in a single industrial process. Alternatively, the motor, pump, and drive may be located in a particular plant in France where the assets are connected either in a process or communicatively. The third application separately accesses a drive of type ACS880-01. Knowledge of the context in which the data is used allows for increased resolution such as the monitoring of assets in an industrial process that accesses a general type of asset such as an industrial drive, a specific type of drive such as the ABB ACS880-01 and a location for each asset.

The query monitoring for queries by the plurality of applications 40 on the information model database 20 results in attribute sets and is cached. A generated pattern is the result of the query. The plurality of applications 40 utilize the resulting patterns along with the tracking of frequency of utilization for the determined patterns which is also stored with the raw access data 32.

Figure 2:
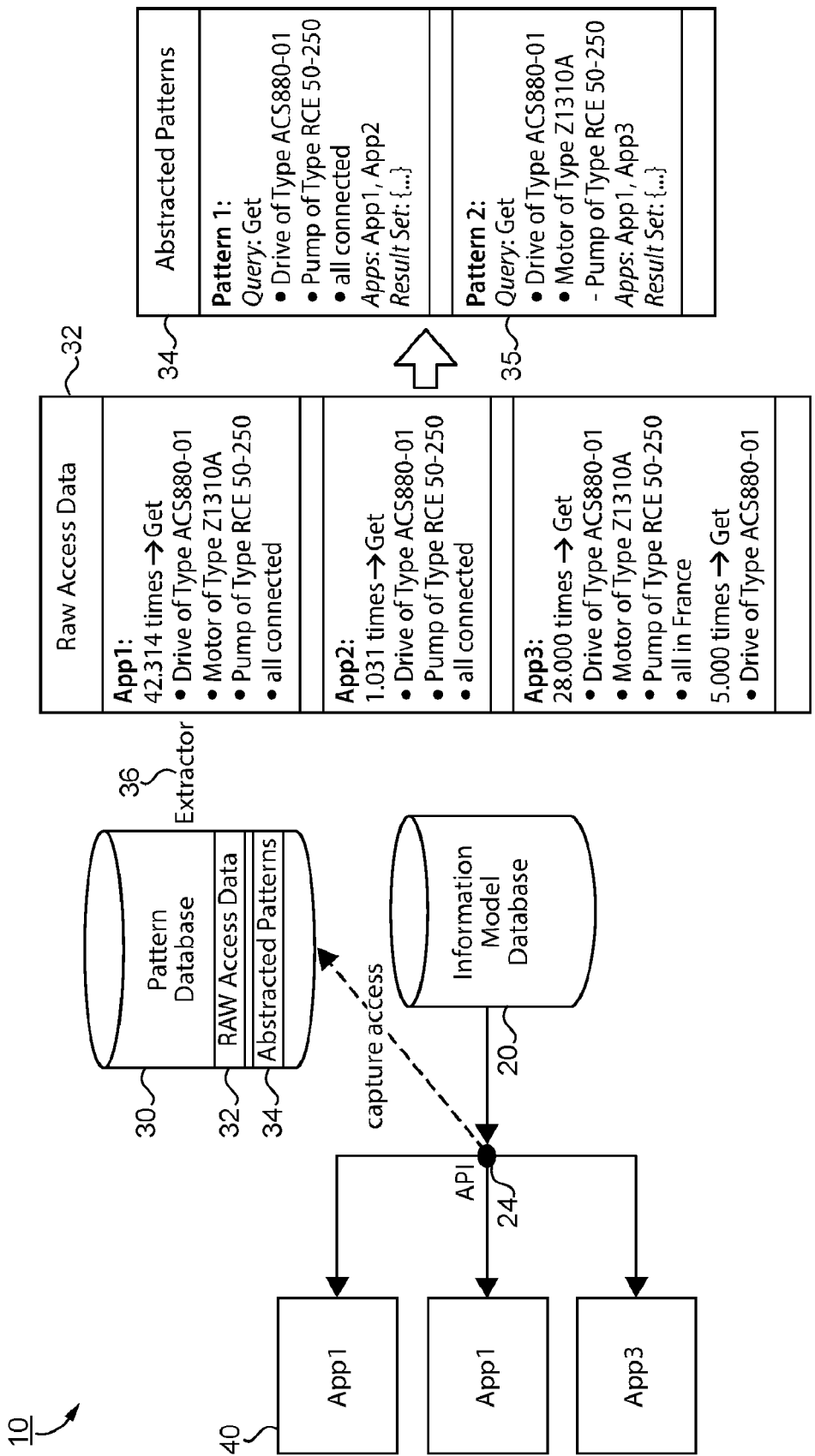
FIG. 2 depicts a pattern database extractor and the generation of patterns from raw access data.

With reference to FIG. 2, the results of the plurality of application 40 queries, now raw access data 32, are acted on by an extractor 36 which generates a first pattern from the first and second application queries that includes, as an example, the drive of type ACS880-1 and pump of type RCE 50-250 that are connected in an industrial process. As the motor of type Z1310A was not included in at least one of the queries on the information model database 20 by the first and second applications, the first abstracted pattern does not contain the motor of type Z1310A as the motor property is a difference as between the raw access data of the first and second application queries. A second abstracted pattern 34, generated by the extractor 36 from the raw access data 32, contains drive type ACS880-01, motor type Z1310A, and pump type RCE 50-250 as the result of the first and third application queries. As the second abstracted pattern 34 is the result of at least one query of assets that are not connected, the second abstracted pattern 34 does not have the property that describes the assets as being connected. Further, as the second abstracted pattern 34 is the result of at least one asset query that does not contain a location, the second abstracted pattern 34 does not include a location.

Figure 3:
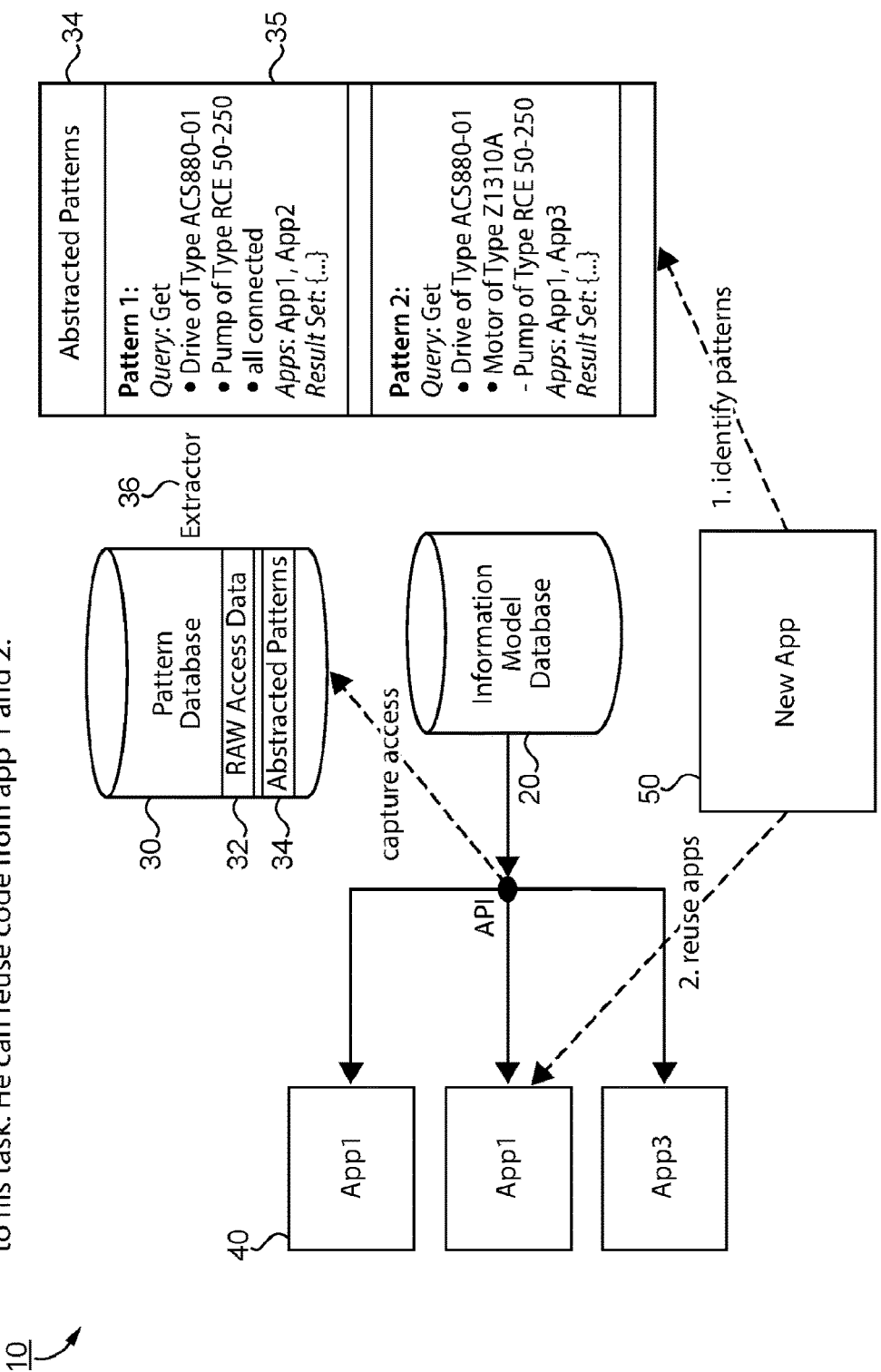
FIG. 3 depicts the creation of a new application and identification of common patterns shared between prior-developed applications and the new application.

Referring now to FIG. 3 and step 3, the programmer develops a new application that accesses data on assets such as a particular drive and pump and searches for a second computer application that is already complete, involving the same drive and pump. Classification of the drive and pump data and semantic extensions of the data that is stored are taken into account when extracting patterns from the pattern database. The programmer accesses the stored patterns based on the search for the drive and pump and determines that a first pattern is relevant.

Figure 4:
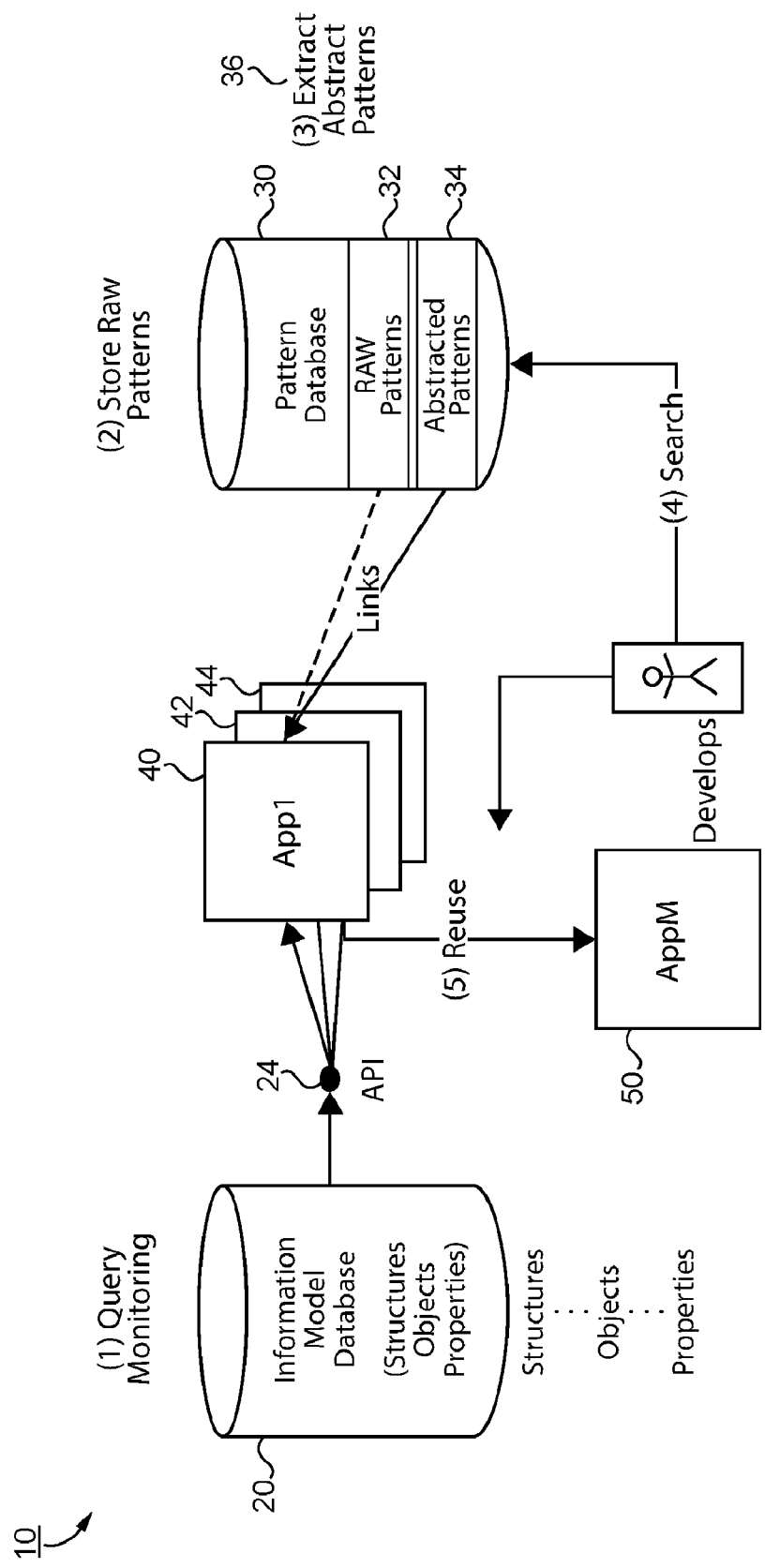
FIG. 4 is a process flow diagram that depicts application querying, extraction of patterns and development of a new application using prior-developed code based on pattern matching.

With reference to FIG. 4, a search is performed by the programmer based on semantic tags that are exact matches of patterns in certain instances but can also be based on semantic compatibility. The application programmer queries the information model database 20 on a set of properties forming a pattern describing a motor and the remaining useful life of that motor to apply to the application a programmer currently has under development. In an alternative and/or additional form, the application programmer queries the pattern database 30 on a set of properties forming a pattern describing a motor and the remaining useful life of that motor to apply to the application a programmer currently has under development. The system 10 identifies any previously accessed or stored pattern from a second application in the pattern database 30 that is similar to the needs of the programmer in the first application under development, and the programmer can reuse the code from the second application in which the pattern is matched as between the first and second applications with respect to the plurality of applications 40 accessing the information model database 20. The system 10 identifies that the first and second applications that use the first pattern are relevant to the new application the programmer is creating. The programmer considers implementing program code associated with the first and second applications in the new application that the programmer is developing. The programmer decides whether the in-development application can utilize the entire code of the application or portions of the code.

The frequency and quality of operational data is utilized in the querying and ranking of the patterns extracted. The operational data is analyzed to determine whether the value is a real-time measured value or has been stored for a period of time. In this manner, the system is able to retrieve the most recent data that is available in the information model and pattern databases. The data retrieved that describes an industrial process and set of assets employed in the process is scored by most recent access, frequency of access and ranked to determine which processes and assets perform the best for the scenario that the particular programmer is seeking to reuse in the new application being developed. The patterns are then ranked based on relevance and importance to the application under development. In one embodiment, the assigned score is correlated to the count of the number of times the application has accessed the raw data. A higher frequency of access by the plurality of applications 40 to the raw data results in a higher score and is highlighted or ranked in the results of the query of the pattern database 36 for ease of identification.

In step 5, the data is gathered and ingested through knowledge of the particular context in which the data is used. By way of non-limiting example, the previously described process may be a boiler feedwater operation and involve the tracking of drive, motor, and pump data during the process. The system 10 analyzes the frequency with which the data describing the boiler operation and the particular assets involved in the boiler operation is accessed, how the assets are connected together and/or communication between the assets.

A/B tests are comparisons between versions of a program to determine which are more successful in relation to usage by a user community. For example, known A/B tests analyze the duration of user interaction in each version to determine which version should be implemented in a productive environment. In the present disclosure, A/B tests are performed by the programmer to compare the first and second applications that access common patterns to determine suitability of the program code for the industrial process so that the programmer can choose the code from the various applications that have accessed the same patterns of properties the programmer will access in the application under development. The ranking or highlighting of program code for reuse in a new application through an A/B test presents results to a user in the order of perceived relevance to the user query based on frequency of access to common sets of information model 20 data by the applications 40. This logic is used by the analysis engine 38 to present at least one application 40 of interest to a user or otherwise indicate no suitable matches.

The programmer, based on the pattern matching and ranking as between the identified patterns of the first and second applications, implements code from the first application into the in-development application. Alternatively, the programmer may implement code from both of the first and second applications into the in-development application.

The application reuse and pattern match system 10 addresses the tracking of current and historical asset location, such as prior physical location(s), current physical location, and the movement of assets from one geographical location to another. By way of non-limiting example, a plurality of applications 40 query the information model database 20 to generate patterns in the pattern database 30 for pump of type X (such as RCE 50-250) now in location Y (such as Germany). Once the pump of type RCE 50-250 moves to France, the information model 20 is updated with the second location and the application query and pattern database 30 will not capture the pump of type RCE 50-250 because the pump is no longer located in Germany. It should be understood that the geographical location may be a country, region, city, facility location and/or GPS coordinate set.

The applications query the pattern database 30 in a second attempt for 'pump type' RCE 50-250 that 'has ever been located in Germany.' Once the pump moves to France, the information model 20 is updated with the pump type location in France. However, in the second query the moved pump is captured in the results and populated in the pattern database 30 because the query requested historical data on the pump location.

The plurality of applications 40 on the information model database 20 for pump type RCE 50-250 that has ever been in location Y populates the pattern database 30 with patterns (in an additional and/or alternative embodiment, queries from the plurality of applications 40 are used to populate the pattern database 30 with raw access data 32). The application returns results (e.g. the application reuse and pattern match system 10 returns results from the query of the pattern database 30 or results are returned from the abstracted patterns 34 produced by the extractor 36) such as every pump of type RCE 50-250 that has been located/checked in to location Y at the time of the query or any time preceding the query. The frequency of application queries on the aforementioned patterns allows the applications accessing the patterns to be ranked, with the highest frequency of access to the desired patterns being retrieved and/or presented prominently to the developer via the web graphical user interface, a command line query or a cloud service that generates data the developer can access directly or consume on demand as a service. A developer's query on the pattern database 30 for the above referenced pump types and/or locations, returns a list and indicates the order of relevance for the applications accessing the desired patterns for use in the developer's in-development application that is used to track location of the asset(s) for various purposes, including but not limited to maintenance of the assets.

Another example of an industrial process the pattern extraction and reuse system and method addresses is the monitoring of sensor data for assets. For example, a developer can address the overheating of a robot control cabinet in a six-axis robot welding or painting application and repurpose code from other similar applications. The cabinet contains a controller, central processing unit, and an industrial computer that coordinates robot movement. Temperature sensors and fans monitor the environment inside the cabinet. A predictive maintenance application sends queries which are stored as raw data for the controller, central processing unit, industrial computer and associated monitored properties. A programmer developing a first application to detect a pattern leading to high temperatures over a set threshold in a robot cabinet during operation determines that there is a pattern that includes the controller, central processing unit, industrial computer, robot, and temperature sensor in an existing second application. The programmer selects the second application from which to repurpose the code based on the similarity and match with the identified pattern in the first application under development.

Yet another example using time series data from the time series data storage 12 is the measurement of pressure values upstream and downstream of a filter in a pipe or water treatment system. If the time series measurements 12 indicate the pressure is increasing in the pipe, then the filter is getting clogged in the water treatment process. The developer is working on an application that can detect problems in a water treatment process that has a particular pump, filter and pressure sensor. The developer searches (e.g. the developer searches the pattern database 30) for the particular pump, filter and pressure sensor and finds a match on at least one application 40 for which the same pump, filter and pressure sensor data has been accessed at least $10^4$ times. The system 10 presents the application 40 to the developer based on matches as between the pump, filter and pressure sensor being accessed in the in-development application.

The programmer extracts selected code from the second application or the plurality of applications to build and complete a first, in-development application. It should be understood that common properties in a pattern as between the first and the second applications indicate compatibility of the computer code of the applications so that the development time is significantly reduced.

As will be appreciated given the discussion herein, various alternative and/or additional embodiments can include the ability to detect access of data in an information model database 20, one ability of which is provided by one or more API's 24 associated with one or more of a plurality of applications accessing the data in database 20. Such data can include time series data (e.g. time history information of temperature, type of asset, etc). The access of data from the information model database 20 can take the form of a program or other utility that, for example, is written to evaluate a temperature and perform a calculation upon it. A pattern database 30 can be created from the access of information from the information model database 20. Such pattern database 30 can be created using any number of techniques, including via the same API(s) 24 that were used to access the data from database 20. The pattern database 30 includes raw access data 32 from the individual API(s). An extractor 36 can be used to abstract the raw access data 32 to form abstracted patterns 34 from which a result can be returned which can be helpful in reusing application code.

In one aspect the present application provides a method for reuse of computer code in a new application, comprising: querying, by a first application via a processor, on data in an information model database; storing the query of the first application on the information model database as raw access data; extracting a pattern from the raw access data describing a set of assets accessed by the first application; storing the pattern in a pattern database; querying on the pattern database for a pattern accessed by the first application for use in a second application; determining a pattern match between the asset pattern data accessed by the first and second in-development application; and presenting to a user, the first application as an option for use in the second in-development application.

One feature of the present application includes implementing code from the first application in the in-development application; and using the first application to monitor the operation of an asset described by the pattern data.

One feature of the present application provide wherein the pattern match is based on frequency of access to asset pattern data by a plurality of applications.

Another feature of the present application provides wherein the pattern match is based on the number of matched properties within a set of asset pattern data as between the pattern data accessed by the first and second applications.

Yet another aspect of the present application provides a computer-implemented method for developing a first application by reusing program code from a second application, comprising: monitoring queries from a plurality of computer applications on data in an information model database; storing results of the queries as raw access data; extracting patterns from the raw access data to describe an asset and an operating characteristic of the asset; storing the patterns in a pattern database; determining that the second computer application describes the asset and operating characteristics of the asset based on a shared pattern between the first computer application and the second computer application; ranking the second computer application against other applications accessing the shared pattern based on the degree of overlap of the shared pattern.

Another feature of the present application includes presenting the second application and other applications accessing the shared patterns in an order of relevance to the user.

Another feature of the present application provides wherein the asset and operating characteristics are used to calculate a remaining useful life for the asset based on the most relevant application match on the pattern database query.

Another feature of the present application provides wherein the first computer application is selected based on frequency of access to the shared pattern across a plurality of applications.

Another aspect of the present application provides a system for re-using computer code from at least one existing application in a new application, comprising: a cloud gateway for receiving data from a plurality of assets; a time event processor for handling time series data of the assets; a time series data storage for storing time series data handed by the time event processor; an information model database for storing metadata describing a plurality of assets; a plurality of applications for querying the information model database for metadata describing at least one asset resulting in raw access data; an extractor for extracting patterns from the raw access data to generate patterns therefrom; a pattern database for storing the patterns of access generated by the plurality of applications accessing the information model database metadata; and an analysis engine for ranking patterns based on overlap of the applications accessing the same patterns as the new application.

One feature of the present application includes a graphical user interface for presenting the ranked patterns to the user.

Yet another aspect of the present application provides a method for reuse of computer code in a new application, comprising: querying, by a first application via a processor, on data in an information model database; storing, by the processor, the query of the first application on the information model database as raw access data; extracting, by the processor, a pattern from the raw access data describing an industrial asset accessed by the first application; storing, by the processor, the pattern in a pattern database; querying, by the processor, on the pattern database for a pattern accessed by the first application for use in a second application; determining, by the processor, a pattern match between the industrial asset pattern data accessed by the first and second applications; and presenting to a user, the first application as an option for use in the second in-development application.

A feature of the present application includes implementing code from the first application in the in-development application; and using the first application to monitor the operation of the industrial asset described by the pattern data.

Another feature of the present application includes using the first application to track the physical location of the industrial asset.

Yet another feature of the present application includes using the first application to track the physical location of a plurality of industrial assets for maintenance.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

The invention claimed is:

1. A method for reuse of computer code in a new application, comprising:
   a. querying, by a plurality of applications via a processor, on data for an industrial asset in an information model database;
   b. storing, by the processor, a plurality of the queries by the plurality of applications on the information model database as raw access data;
   c. extracting, by the processor, a plurality of patterns from the raw access data describing the industrial asset accessed by the plurality of applications;
   d. storing, by the processor, the plurality of patterns in a pattern database;
   e. querying, by the processor, on the pattern database for an asset pattern data accessed by the plurality of applications for use in an in-development application;
   f. determining, by the processor, a pattern match between the asset pattern data accessed by one of the plurality of applications and the in-development application, wherein the pattern match is based on a set of matched properties describing the industrial asset and a frequency of utilization of the raw access data by the one of the plurality of applications;
   g. presenting to a user, the one of the plurality of applications as an option for use in the in development application;
   h. implementing code from the one of the plurality of applications in the in-development application; and
   i. using the one of the plurality of applications to monitor the operation of the industrial asset described by the pattern match.

2. The method of claim 1 wherein the pattern match is based on a set of properties describing a motor and a remaining useful life of the motor.

3. The method of claim 1 wherein the pattern match is further based on a ranking of most recent raw access data within the asset pattern data.

4. The method of claim 1, comprising:
   j. using the first application to track the physical location of the industrial asset.

5. The method of claim 1, further comprising:
j. using the first application to track the physical location of a plurality of industrial assets for maintenance.

6. A computer-implemented method for developing a first computer application by reusing program code from a second computer application, comprising:
- monitoring queries from a plurality of computer applications on data for an industrial asset in an information model database;
- storing results of the queries as raw access data;
- extracting patterns from the raw access data to describe the industrial asset and an operating characteristic of the industrial asset;
- storing the patterns in a pattern database;
- determining that the second computer-application describes the industrial asset and operating characteristics of the industrial asset based on a shared pattern between the first computer application and the second computer application; and
- ranking the second computer application against other applications accessing the shared pattern based on the degree of overlap of the shared pattern between the first computer application and the second computer application, wherein the ranking is based at least in part on a set of matched properties describing the industrial asset and a frequency of utilization of the raw access data by the second computer application.

7. The computer-implemented method of claim 6, further comprising: presenting the second computer application and other applications accessing the shared patterns in an order of relevance to the user.

8. The computer-implemented method of claim 6, wherein the industrial asset and operating characteristics are used to calculate a remaining useful life for the industrial asset based on the most relevant application match on the pattern database query.

9. The computer-implemented method of claim 6, wherein the ranking of the second computer application is further based on most recent raw access data in the shared pattern.

10. A system for re-using computer code from at least one existing application in a new application, comprising:
- a cloud gateway for receiving data from a plurality of industrial assets;
- a time event processor for handling time series data of the plurality of industrial assets;
- a time series data storage for storing time series data handled by the time event processor;
- an information model database for storing metadata describing the plurality of industrial assets;
- a plurality of applications for querying the information model database for metadata describing at least one industrial asset resulting in raw access data;
- an extractor for extracting patterns from the raw access data to generate patterns therefrom;
- a pattern database for storing the patterns of raw access data generated by the plurality of applications accessing the information model database metadata; and
- an analysis engine for ranking patterns based on overlap of the plurality of applications accessing the same patterns as the new application, wherein the ranking is based at least in part on a set of matched properties describing the at least one industrial asset and a frequency of utilization of the raw access data by the plurality of applications.

11. The system of claim 10, further comprising: a graphical user interface for presenting the ranked patterns to the user.

* * * * *